United States Patent
Didcock et al.

(10) Patent No.: US 7,231,022 B2
(45) Date of Patent: Jun. 12, 2007

(54) OPTIMAL CALL COVERAGE METHOD AND APPARATUS

(75) Inventors: Clifford Neil Didcock, Wantage (GB); Michael Geoffrey Andrew Wilson, London (GB)

(73) Assignee: Avaya UK, Guilford, Surrey (GB)

( * ) Notice: Subject to any disclaimer, the term of this patent is extended or adjusted under 35 U.S.C. 154(b) by 0 days.

(21) Appl. No.: 10/888,375

(22) Filed: Jul. 9, 2004

(65) Prior Publication Data

US 2005/0111634 A1 May 26, 2005

(30) Foreign Application Priority Data

Sep. 17, 2003 (EP) .................................. 03255830

(51) Int. Cl.
*H04M 11/08* (2006.01)
(52) U.S. Cl. .................... 379/88.18; 379/221.06; 370/352
(58) Field of Classification Search ................ 370/352, 370/389, 392; 379/90.01, 93.07, 114, 88.25, 379/88.18, 67.1, 221.06
See application file for complete search history.

(56) References Cited

U.S. PATENT DOCUMENTS

| 5,619,554 | A | 4/1997 | Hogan et al. |
| 5,781,615 | A * | 7/1998 | Bales et al. ............... 379/88.18 |
| 6,181,780 | B1 * | 1/2001 | Finnigan ..................... 379/67.1 |
| 6,411,684 | B1 | 6/2002 | Cohn et al. |
| 6,735,297 | B1 * | 5/2004 | McCormack et al. .. 379/221.06 |
| 6,909,708 | B1 * | 6/2005 | Krishnaswamy et al. ... 370/352 |
| 2001/0011303 | A1 | 8/2001 | Chang et al. |
| 2004/0120480 | A1 | 6/2004 | Didcock et al. |

FOREIGN PATENT DOCUMENTS

| EP | 0 567 294 A2 | 10/1993 |
| EP | 0 841 796 A2 | 5/1998 |
| EP | 0 843 453 A2 | 5/1998 |
| EP | 0 913 982 A2 | 5/1999 |
| EP | 1 109 391 A2 | 6/2001 |
| WO | WO 99/21344 A | 4/1999 |

* cited by examiner

*Primary Examiner*—Gerald Gauthier
(74) *Attorney, Agent, or Firm*—Ryan, Mason & Lewis, LLP (57) ABSTRACT

A messaging architecture including at least two messaging systems, each messaging system being associated with a telephony switch connected to at least one messaging system subscriber and a mailbox for providing voice messaging services for calls to said at least one messaging system subscriber, the mailboxes for each of the at least two messaging systems being accessible via each messaging system, wherein each telephony switch is adapted to selectively route a call for a subscriber mailbox to one of the messaging systems for access to the subscriber mailbox.

19 Claims, 5 Drawing Sheets

OPTIMAL CALL COVERAGE METHOD AND APPARATUS

RELATED APPLICATIONS

The present application claims the priority of European Patent Application No. 03255830.6 filed Sep. 17, 2003 and entitled "Optimal Call Coverage Method and Apparatus."

FIELD OF THE INVENTION

The present invention relates to the field of messaging systems, and particularly to voice and unified messaging systems.

BACKGROUND TO THE INVENTION

Messaging systems are well-known in the art. One of the simplest forms of messaging system is a voice messaging system. Computer Telephony Integration (CTI) is a term which refers to the integration of computer architectures with telephony systems. A voice messaging system is an example of a CTI system, and a further example is a unified messaging system.

A voice/unified messaging system may be implemented in conjunction with a private voice network. Each phone terminal in the private voice network is connected to a private branch exchange (PBX). Multiple PBXs may be provided to form the private voice network in a typical enterprise implementation. When a call is established between two phone terminals in the private network, each associated with different PBXs, then a communication must be supported between the PBXs. For this purpose, a PBX network is typically provided to provide for interconnections between the PBXs, for example utilizing the Q.SIG networking protocol.

A characteristic of voice/unified messaging systems is that various services are provided, such as voice messaging services. This enables a calling party to leave a voice message in a voice mailbox of a called party. In order to support this feature of a voice/unified messaging system, it is necessary for the communication between PBXs to be maintained during the entire call session even if the called party does not answer, when the called party greeting is being played and the voice message is being recorded. Thus, disadvantageously, network capacity and resources are consumed when voice messages are being recorded.

It is an aim of the present invention to provide an improved messaging system. An aim is to overcome the above-stated problem.

SUMMARY OF THE INVENTION

In one embodiment, the invention provides a messaging architecture including at least two messaging systems, each messaging system being associated with a telephony switch connected to at least one messaging system subscriber and a mailbox for providing voice messaging services for calls to said at least one messaging system subscriber, the mailboxes for each of the at least two messaging systems being accessible via each messaging system, wherein each telephony switch is adapted to selectively route a call for a subscriber mailbox to one of the messaging systems for access to the subscriber mailbox.

There may be provided a data connection between the messaging systems.

The functionality of each messaging system may be divided between a front-end system and a back-end system, the back-end system for each messaging system providing the functionality for supporting the subscriber mailboxes.

The back-end system for each messaging system may be provided in a centralized system.

The front-end system may be adapted to access each subscriber mailbox via the centralized back-end system.

Each telephony switch may be adapted to selectively route the call in dependence upon a least-cost route for establishing a connection to the voice server front-end system.

Each telephony switch may be adapted to selectively route the call to a messaging system associated with the origin of the call. The call may be routed via the telephony switch associated with the messaging system associated with the origin of the call.

The at least two messaging systems may be associated with respective voice mail domains, wherein the messaging systems are further adapted to handle a call in accordance with the requirements of the voice mail domain with which the called subscriber mailbox is associated.

In an embodiment, the invention also provides a method of storing a voice mail message in a messaging architecture including at least two messaging systems, each messaging system being associated with a telephony switch for connection to at least one messaging system subscriber and a mailbox for providing voice messaging services for calls to said at least one system subscriber, the method comprising providing access to each subscriber mailbox for each of the at least two messaging systems, the method further comprising, at the telephony switch, selectively routing a call for a subscriber to one of the messaging systems; and thereby accessing the subscriber mailbox.

The method may further comprise the step of providing a data connection between the messaging systems for routing the call.

The method may further comprise dividing the functionality of each messaging system between a front-end system and a back-end system, wherein the back-end system provides the functionality for supporting the subscriber mailbox.

The method may further comprise the step of providing a centralized system for supporting said back-end systems. The method may further comprise the step of adapting each front-end system to access each subscriber mailbox via the centralized back-end system.

The method may further comprise the step of controlling each telephony switch to selectively route the call in dependence upon a least-cost route for establishing a connection to the mailbox.

The method may further comprise the step of controlling each telephony switch to selectively route the call to a messaging system having the closest geographical location to the telephony switch to which the calling party is connected.

The call may be routed via the telephony switch associated with the messaging system having the closest geographical location to the telephony system.

The at least two messaging systems may be associated with respective voice mail domains, the method further comprising adapting the messaging systems to handle a call in accordance with the requirements of the voice mail domain with which the subscriber mailbox is associated.

In an embodiment, the invention provides a messaging system for connecting to a telephony switch for connection to at least one messaging system subscriber and associated with a subscriber mailbox for providing voice messaging services for calls to said at least one messaging system subscriber, the messaging system being adapted to receive calls for a different subscriber mailbox, and direct such calls to said different subscriber mailbox.

In an embodiment, the invention provides a messaging system for connection to a telephony switch for connection to at least one messaging system subscriber and associated with a subscriber mailbox for providing voice messaging services for calls to said at least one messaging system subscriber, the messaging system being adapted to receive calls for the subscriber mailbox from a different messaging system.

In an embodiment, the invention provides a telephony switch for connection to at least one subscriber of a messaging system associated with a subscriber mailbox for providing voice messaging services for calls to said at least one messaging system subscriber, the telephony switch being adapted to selectively route calls to the subscriber mailbox via the messaging system.

The calls may be routed selectively in dependence on the origin of the call. The calls may be routed to a further messaging system local to the origin of the call. The calls may be routed to the messaging system in dependence on the messaging system being the local messaging system of the origin of the call. The telephony switch may be routed to a further messaging system by a further telephony switch associated with that further messaging system.

BRIEF DESCRIPTION OF THE DRAWINGS

The invention is now described by way of example with reference to the accompanying figures, in which.

DESCRIPTION OF THE PREFERRED EMBODIMENTS

The present invention is described herein by way of reference to a particular example, and in particular to the example of a unified/voice messaging system. However the invention is not limited in its applicability to the specifics of the examples and embodiments described herein.

Figure 1:
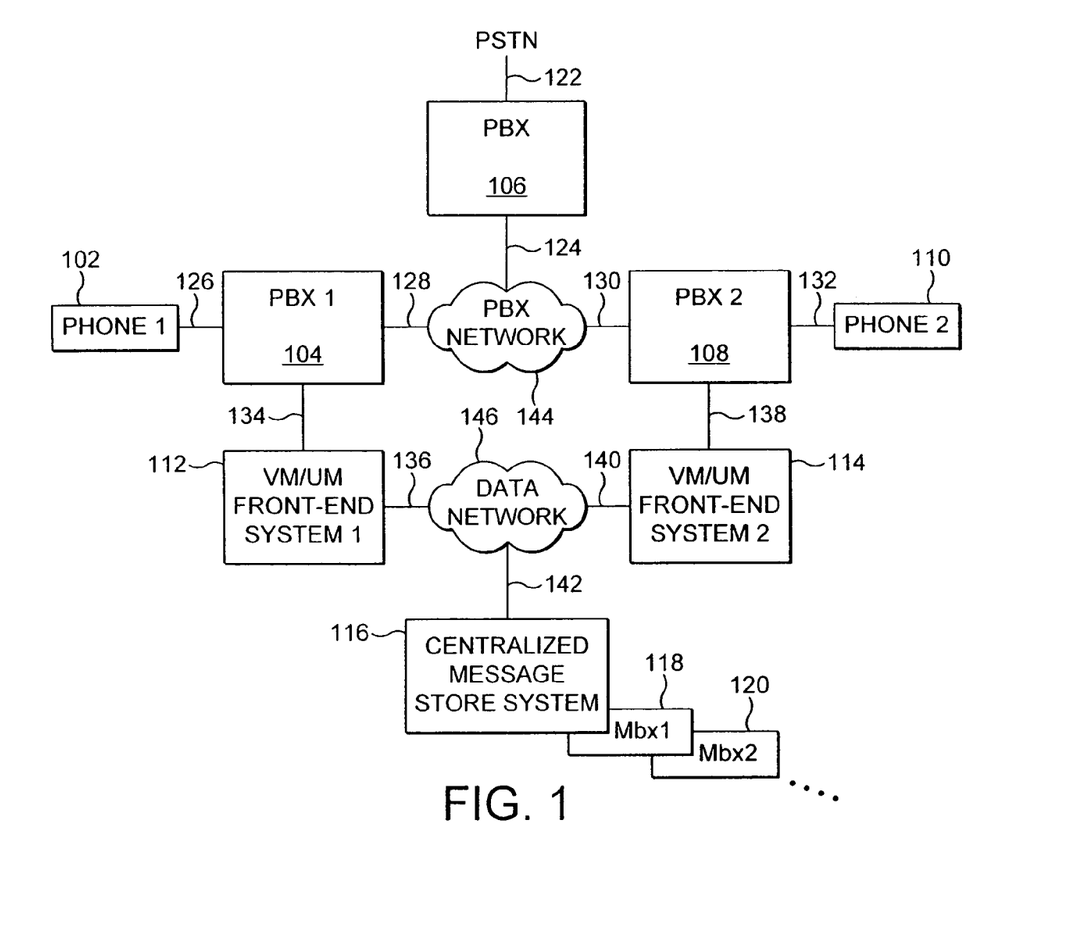
FIG. 1 illustrates an example of a voice or unified messaging system architecture in which telephone switches and front-end messaging systems are deployed at multiple locations, together with centralised messaging functionality suitable for use in accordance with an embodiment of the invention.

Referring to FIG. 1 there is shown a messaging architecture comprising two unified/voice messaging systems deployed in a geographically distributed manner, and adapted for implementing a preferred embodiment of the present invention.

At a first location there is provided a first PBX 104, connected to an associated first voice or unified messaging system 'front-end' 112. At a second distributed or remote location there is provided a second PBX 108, connected to an associated second voice or unified messaging system 'front-end' 114. The functionality of the 'front-end' system is described further hereinbelow.

Each of the PBXs 104 and 108 is associated with a respective plurality of telephone terminals. For the purpose of understanding the present invention, there is shown in FIG. 1 a first telephone terminal 102 connected to the first PBX 104 via communication link 126, and a second telephone terminal 110 connected to the second PBX 108 via communication link 132.

Each of the PBXs 104 and 108 is further connected to a PBX network 144 via respective communication links 128 and 130. The PBX network 144 enables communications between PBXs of a private voice network to be interconnected. A further PBX 106 is connected to the PBX network 144 via communication link 124, and provides access to the public switched telephone network (pstn) via communication link 122.

Each of the voice or unified messaging front-ends 112 or 114 may be considered to be remote or distributed voice or unified messaging systems. Each of the remote voice or unified messaging systems 112 or 114 is connected to a data network 146 via respective communication links 136 and 140. The data network 146 provides a connection to a common, centralised message store system 116 via communication link 142. The centralised message store system 116 may be considered to be a centralised data facility for messages for each voice or unified messaging system. The centralised message store system 116 provides 'back-end' functionality to compliment the 'front-end' functionality of each voice or unified messaging system. The functionality of the 'back-end' system is described further hereinbelow.

The centralised message store system 116 is provided with a plurality of mailboxes, one for each served telephone/user of each PBX. In FIG. 1 there is shown a first mailbox Mbx1 118 for a user of the first messaging system, corresponding to the first phone 102, and a second mailbox Mbx2 120 for a user of the second messaging system, corresponding to the second phone 110.

From FIG. 1, it can be understood that the functionality of each voice/unified messaging system is divided between a front-end system and the centralised message store system, which may alternatively be considered a back-end system. For the purpose of the invention, as will be described further hereinbelow, the message store system preferably provides the functionality to support the mailboxes for each user of each voice or unified messaging system. All other functionality of the voice or unified messaging system is provided in the front-end system. It is envisaged that in embodiments additional aspects of the functionality may be deployed to the centralised message store system, more generally forming a system back-end, in accordance with implementation requirements.

For the purposes of the present invention, the centralised message store system is adapted to allow access to the mailboxes for all voice or unified messaging system from any voice or unified messaging front-end. Thus, for example, the voice or unified messaging front-end 112 may access the mailbox Mbx1 118 or the mailbox Mbx2 120.

The functionality of the voice or unified messaging system front-ends 112 or 114 provide certain voice/unified messaging functions for users connected to the respective PBXs 104 or 108. The nature of such messaging functions are well-known to one skilled in the art, and outside the scope of the present invention. However, the front-end (or remote) system functionality may include, for example, call answering and automated attendant functionality.

It should be noted that although the embodiment specifically discloses the provision of PBXs at remote locations, more generally the remote locations can be considered to be provided with a switching capability, or a telephony/telecommunications switch. The invention is not limited to PBX implementations.

The functionality of the architecture of the system of FIG. 1 in accordance with the preferred embodiment of the invention is now further described. For the purpose of describing the invention, an example is presented of a call made from the first phone 102 to the second phone 110, with further reference to FIG. 2.

A user associated with the first phone 102 dials the number of the second phone 110, and in accordance with conventional techniques the first PBX 104 associated with the first phone 102 directs the call to the second PBX 108 via the PBX network 144, in order to establish a call between the calling extension or calling party and the called extension or called party.

Figure 2:
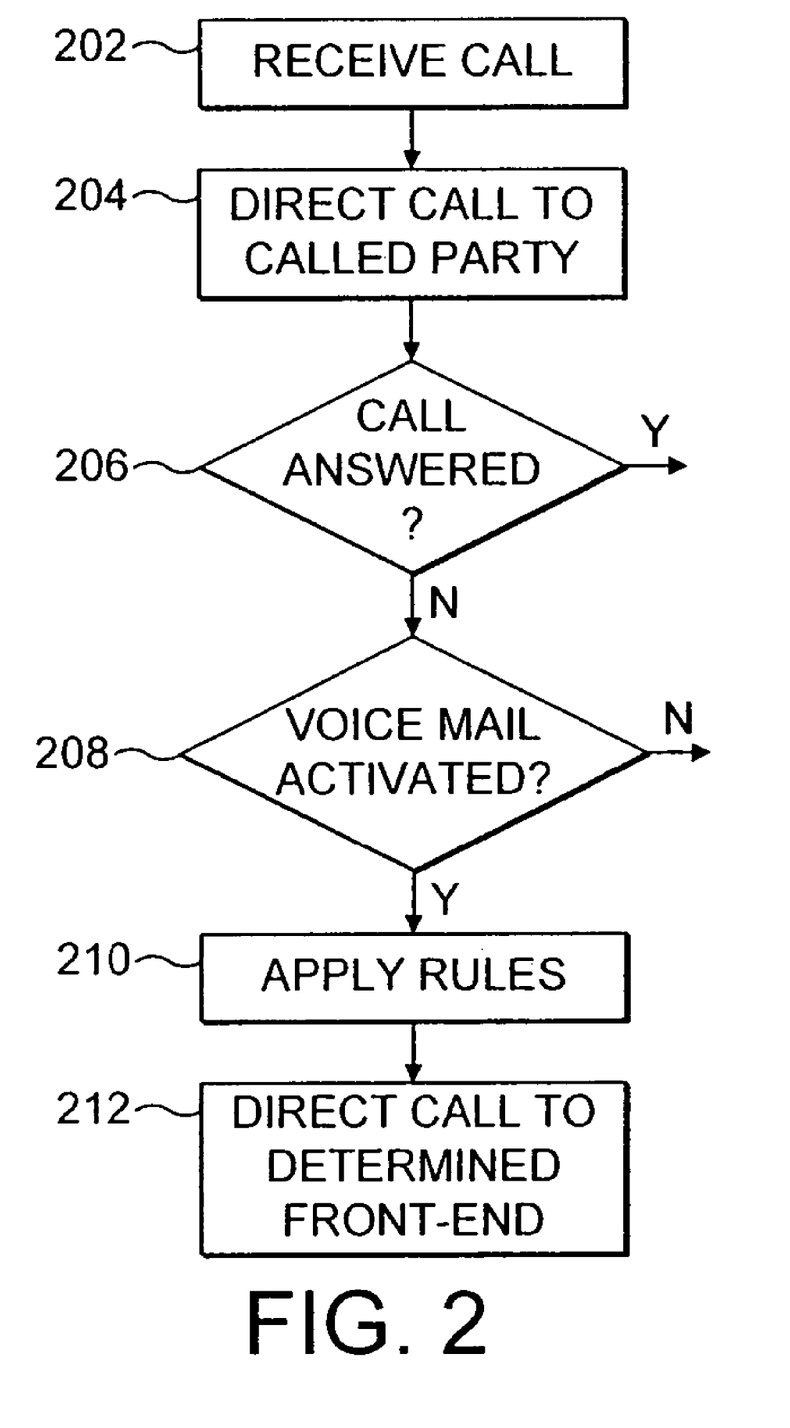
FIG. 2 illustrates the process steps in handling a call to a phone provided with a voice messaging service in accordance with an embodiment of the invention.

Referring to FIG. 2, in a step 202 the second PBX 108 receives the call, and in a step 204 directs the call to the called extension, being the second phone 110. In a step 206 it is determined by the PBX 108 whether the call is answered. If the call is answered, then a call is established between the calling extension and the called extension in the conventional manner.

If the call is not answered, for example after a predetermined number of rings, then in a step 208 the second PBX 108 determines whether a voice mail feature is activated for the second phone 110. If the voice mail feature is not activated, then the conventional further processing of the call takes place, which may be continuous ringing, or termination of the connection.

In accordance with embodiments of the invention, on determination that voice mail services are activated for the second phone 110, the second PBX 108 applies call coverage rules for the further processing of the call in a step 210. The purpose of the call coverage rules is to determine the appropriate routing of the call in order to use voice mail services for leaving a voice message.

In prior art systems, if voice mail services are activated then in the example scenario described above the voice or unified messaging system associated with PBX 108 interacts with the caller to play the called party's greeting and record any voice message and deliver it to the voice mailbox of that messaging system. Thus in the example of FIG. 1, the voice or unified messaging front-end 114 would direct the voice message to the mailbox Mbx2 120. This requires the call connection between the PBXs 104 and 108 to be maintained throughout.

In accordance with embodiments of the invention, call coverage rules are applied in the PBX to which the called extension is connected, to intelligently route the call in a more effective manner.

In a preferred embodiment of the invention, the call coverage rules determine the origin of the call, and route the call to a voice or unified messaging front-end system associated with the least cost route, such as the front-end having the closest geographical proximity to the origin of the call.

For example, in the present example the call coverage rules applied in the second PBX 108 determine that the call originates from the extension of first phone 104, and determines that the first voice or unified messaging front-end system 112 is the nearest messaging system to that extension. As such, the PBX 108 routes the call to the voice or unified messaging front-end system 112 via PBX 104. The PBX 108 may be able to simply identify the PBX 104 based on the calling extension number.

The preference is for the voice mail to be routed in dependence on the least cost route available. The rules required to implement this may vary. For example, an assumption may be made that the voice or unified messaging system associated with the PBX from which the call originated offers the least cost route. Alternatives may exist for this technique. For example, rather than basing the determination on the identification of the extension number of the calling party, the call coverage rules may simply determine the PBX from to which the extension is connected, and return the call to that PBX. The implementation of a call coverage algorithm in the PBXs may vary, and is within the scope of one skilled in the art.

Referring again to the described example, the second PBX 108 determines that the call originated from the first PBX 104. This is achieved by identifying the source addresses in the conventional control signals received from the first PBX 104. With appropriate signaling via the PBX network 144, the second PBX 108 requests the first PBX PBX 104 to route the call to the messaging system front-end with which it is associated. This request to the first PBX 104 uses conventional signalling. Once the call is returned to the first PBX 104, in the preferred embodiment, the first PBX then switches to connect the call to its associated front-end system 112.

Via the data network 146, and the centralised message store system 116, the voice message is then left on the mailbox Mbx2 120 associated with the called extension. Thus even though the mailbox access is via the first messaging system, the message is stored in the mailbox of the second messaging system front-end and the second phone.

The centralised message store system 116 provides the appropriate recorded announcements for playing to the calling party.

The present invention requires the use of control signaling between the PBXs 104 and 108 in order to implement the technique. The front-end of the messaging system may not require adaptation in an implementation such as shown in FIG. 1. The front-end may require modification in other implementations, such as described hereinbelow with reference to FIG. 3. The centralised message store system controls the access to the mailboxes.

Each PBX is therefore adapted to selectively route a call optimally to a front-end system, rather than automatically to its own front-end system. The implementation of the controlling algorithms for operating the PBXs in accordance with the embodiments of the present invention is an implementation issue which can be addressed by one skilled in the art.

Thus, in a preferred embodiment any connection to the voice or unified messaging system is provided by a voice/unified messaging device local to the calling party, automatically providing the lowest cost route. The invention reduces network burden on the PBX network 144, freeing up network capacity. In certain enterprise networks, calls may be made from one PBX to another via the PSTN, for example where a connection fails in the private network. In such a scenario, the invention clearly provides an immediate cost benefit to the enterprise since the call is not maintained over the PSTN during the period of listening to a greeting message and leaving a voice message.

The implementation of the present invention is not limited to any specific messaging architecture. However the invention may be advantageously implemented in a messaging architecture as described in European patent application number 03252030.6, which discloses a distributed messaging architecture. A further embodiment of the invention is described hereinbelow in relation to such an architecture.

Figure 3:
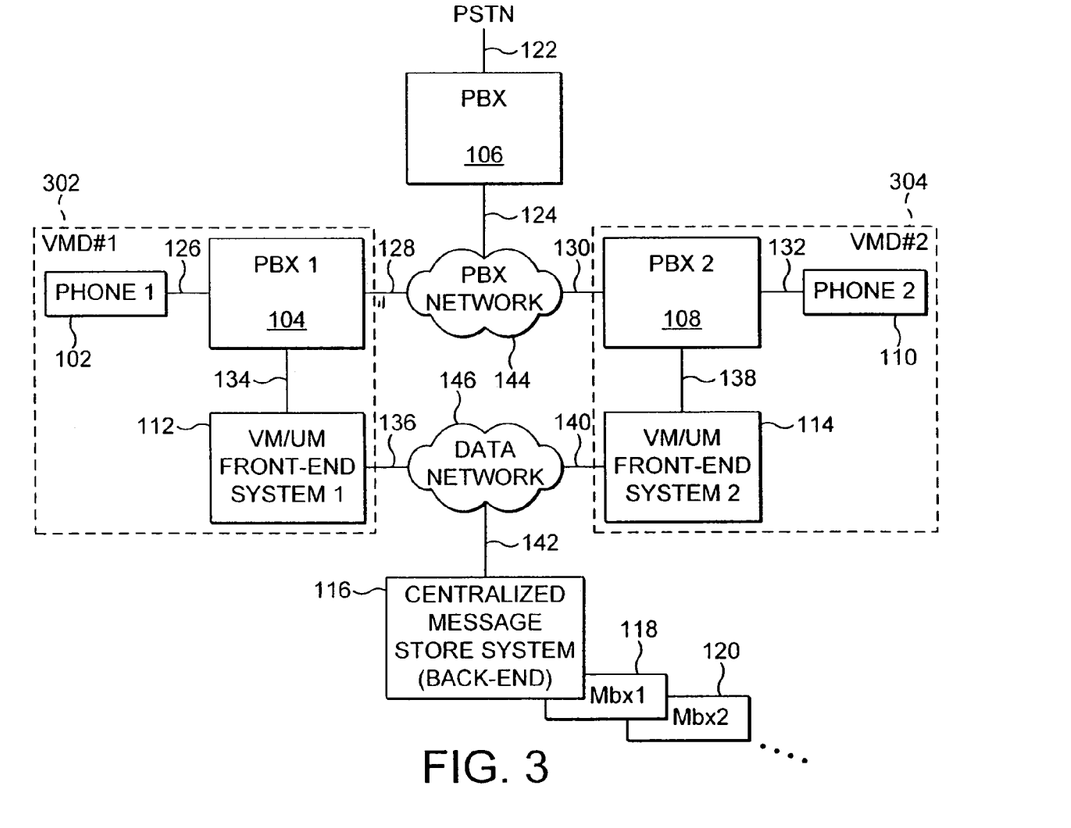
FIG. 3 illustrates the example voice or unified messaging architecture of FIG. 1 adapted to support multiple voice mail domains.

FIG. 3 corresponds to FIG. 1, with further amendment to illustrate a particular embodiment of the invention. Like reference numerals are used in FIG. 3 to refer to elements corresponding to elements of FIG. 1.

In a distributed voice messaging architecture, such as described in European patent application publication number 03252030.6, different voice messaging systems may be associated with different voice mail domains. A Voice Mail Domain (VMD) is a collection of front-end call handling systems and back end mailbox storage systems that combine together to provide a highly scalable and distributed voice unified messaging system. For example, the voice or unified messaging system associated with the PBX 104 may define a first voice mail domain 302, and the voice or unified messaging system associated with the PBX 108 may define a second voice mail domain 304. In such a distributed system, the centralised message store system 116 is more generally a back-end voice or unified messaging system, providing voice or unified messaging functionality for each of the first and second voice mail domains. The back-end system 116 thus may comprise part of the first voice mail domain 302 and the second voice mail domain 304.

In such a distributed architecture, each of the voice mail domains may be associated with a particular geographical site of an enterprise. The voice mail domains may provide voice mail services for different languages, and support operations in different time zones.

In embodiments of the invention, a voice mail intended for the extension of the second phone 110 in the second voice mail domain may be handled by the front-end voice or unified messaging system 112 of the first voice mail domain. However the voice mail is required to be handled as part of the second voice mail domain, as the called extension for the voice mail is part of the second voice mail domain. As such, in this embodiment the voice or unified messaging front-end systems 112 and 114 are further adapted so that they may operate in multiple voice mail domains. Thus, the voice or unified messaging front-end system 112 is adapted to operate in either the first or second voice mail domain. In this way, when a voice mail destined for the called extension associated with phone 110 is diverted to the voice or unified messaging front-end system 112, the voice or unified messaging front-end system 112 operates to handle the voice mail as part of voice mail domain 2. Thus, for example, when the voice mail is written to mailbox Mbx2 120 associated with the second voice or unified messaging system, the characteristics of the second voice mail domain are applied even though the message is routed through the first voice mail domain. For example, the time stamp applied to the message is derived from the time zone associated with the second voice mail domain, and any recorded announcement is played in the primary language of the second voice mail domain, which will ideally be the language of the caller.

Figure 4:
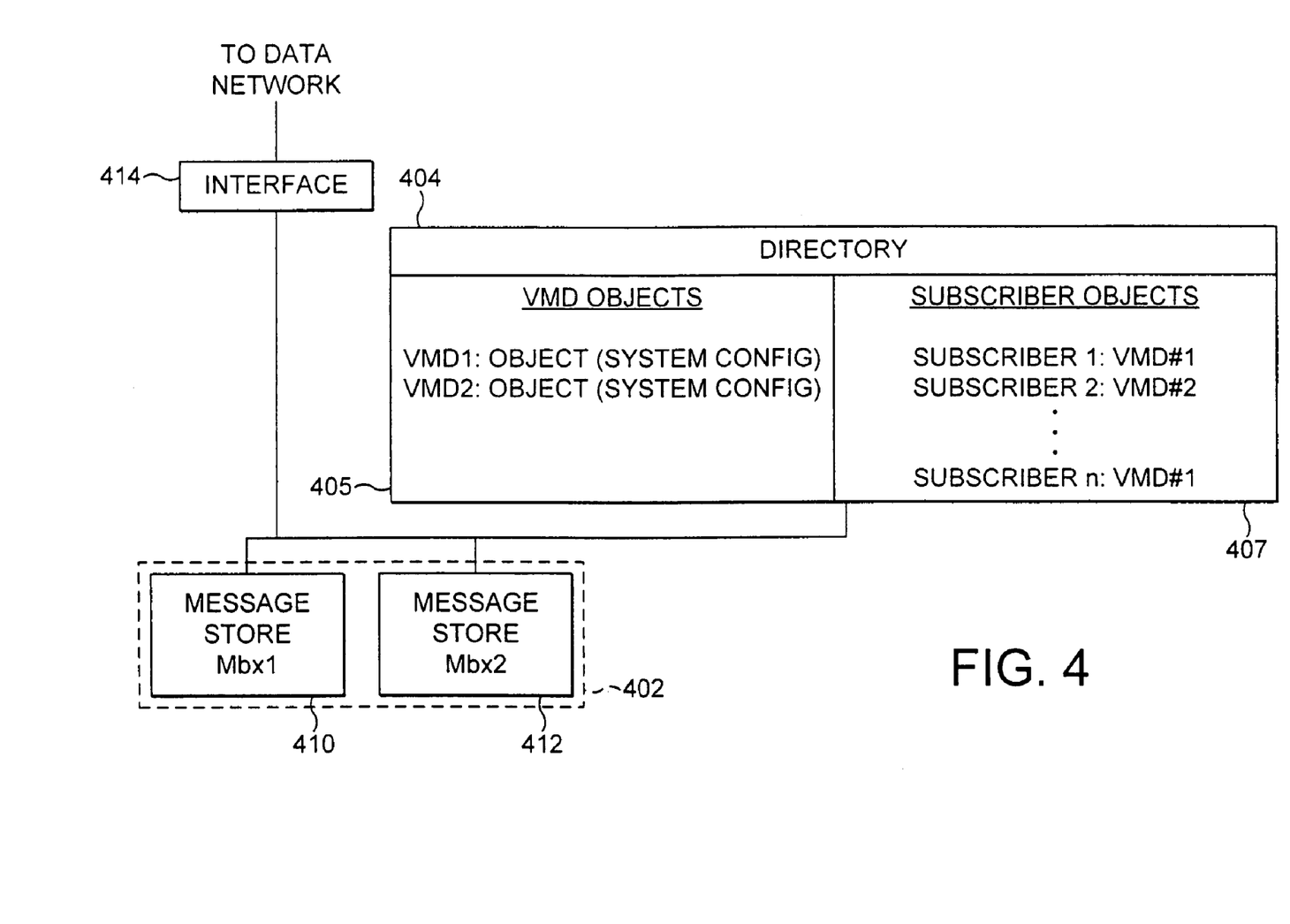
FIG. 4 illustrates an example implementation of the centralised message store system of the embodiment of FIG. 1.

For providing centralised voice or unified messaging functionality, the back-end 116 is configured for all voice mail domains. As shown in FIG. 4 the centralised voice or unified messaging system is provided with a message store 402 and a directory 404. The message store 402 stores messages, such as voice mails and e-mails, associated with users for all voice mail domains. FIG. 4 shows a message store 410 and 412 for each of the mailboxes 118 and 120. The directory 404 stores descriptive attributes associated with the users, and system configuration data. As shown in FIG. 4, the directory 404 stores VMD objects 405 defining system configuration data for each voice mail domain. The directory 404 additionally stores subscriber objects 407, defining the voice mail domain for each of the system subscribers. The back-end 116 further comprises an interface 414 to the data network 146.

Figure 5:
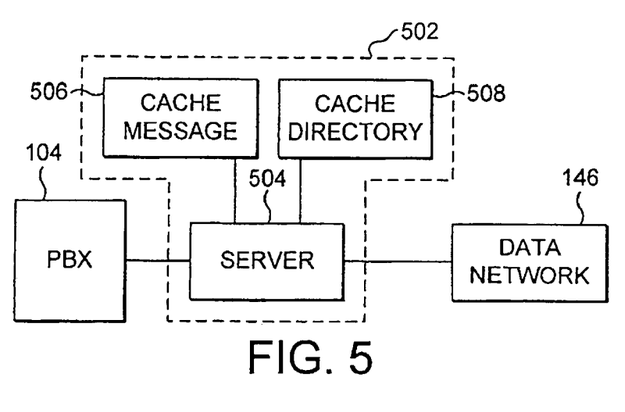
FIG. 5 illustrates an example implementation of a messaging system deployed at a location in the system of the embodiment of FIG. 1.

Further reference is now made to FIG. 5. Each PBX, such as PBX 104, is associated with a remote voice server 504, which may also be considered to be a remote front-end voice server. As can be seen, the remote voice server 504 is connected to the data network 146. The remote voice server 504 is associated with a cache message store 506 and a cache directory store 508. In accordance with this embodiment of the invention, and as discussed further hereinbelow, information associated with the users connected to the PBX 104, and stored in the corresponding message store 402 and directory store 404 of FIG. 4, are copied to the caches 506 and 508 of FIG. 5, such that a local copy of such information is available. Remote voice or unified messaging functionality is provided by the voice or front-end server 504 and caches 506 and 508, generally designated by reference numeral 502 and considered to be the voice or unified messaging front-end for the associated messaging system. It should be further noted that each PBX may be associated with more than one front-end voice server 504.

In accordance with this embodiment of the present invention, the cache directory 508 associated with a voice or unified messaging front-end system additionally stores the VMD objects for other voice mail domains, specifically the system configuration information. In this way, the voice or unified messaging front-end systems are adapted to handle voice mails associated with a voice mail domain other than their own voice mail domain, so that the voice mail can be handled in the appropriate manner and delivered to the centralised message store system 116 in the appropriate manner.

Once the voice mail domain (VMD) and the subscriber are identified the front-end system provides an interaction to the caller and message store system which is identical to that provided by a front-end system of the subscriber's voice mail domain. The front-end systems thus effectively shift their modus operandi based on the voice mail domain information, i.e. the front-end system operates as if it were the voice mail domain identified. All system parameter information is available and used to provide the required interface.

Call answering is a relatively simple process with only limited requirement for access to user and system data. However in order to support this for calls to multiple voice mail domains, the front-end system must store this information for all voice mail domains. The call answering process requires access to data of the following classes:

I. System properties, including system configuration data such as language availability; and II. User properties, such as user configuration data such as 'find-me' rules and user status (e.g. extented absence), as well as associated audio greetings.

The front-end systems associated with each PBX need to maintain a cached copy of this data for all voice mail domains to allow a high degree of quality and reliability in the call answering process regardless of the connectivity to the back-end.

Preferably a cache management process operates in the background (at a pre-defined time interval, e.g. 5 minutes) and creates a local (and persisted) cache of both system and user properties from the back-end primary stores. As shown in FIG. 4, the directory includes voice mail domain (VMD) objects and subscriber objects. For VMD objects the system configuration parameters for each voice mail domain are defined. For subscriber objects the VMD identity for each subscriber is defined. This information is cached at the remote system. The cache management is preferably provided by the front-end or remote system. A time-stamp is preferably stored for user greetings in the message store. Before an audio greeting is played, the front-end system may check the time of last-update on the back-end primary version of the greeting. If the front-end cached version of a greeting is correct, then it is used. Otherwise a copy may be fetched from the back-end. In general, call answering results in recording an audio message. This can be submitted for delivery in the background with little real-time network capability.

As discussed above, voice messaging or unified messaging functionality in the first voice mail domain and the second voice mail domain for each messaging system is preferably provided with the localized cached information. Where functionality requires direct centralised access, this can be provided by access to the centralised data facility via the data network.

It should be noted that although the invention has been described herein by way of reference to a particular distributed voice/unified messaging architecture, and particularly that described in European patent application number 03252030.6, the invention is not limited to any aspects thereof.

Figure 6:
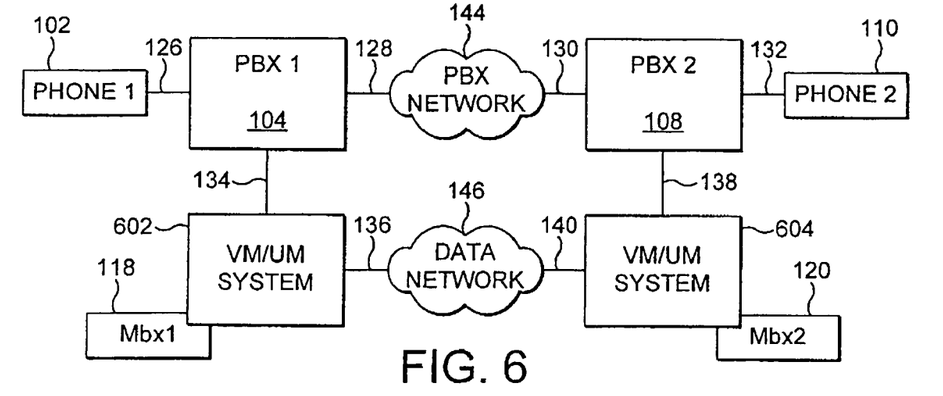
FIG. 6 illustrates the example voice or unified messaging architecture of FIG. 1 adapted to reflect stand-alone voice or unified messaging systems.

By way of further illustration, with reference to FIG. 6 a further messaging system architecture is illustrated in which no messaging functionality is shared or centralised between any of the messaging systems. Like reference numerals in FIG. 6 refer to elements which are the same as those shown in FIG. 1.

Referring to FIG. 6, each of the voice or unified messaging front-end systems 112 and 114 of FIG. 1 are replaced by entire voice or unified messaging systems 602 and 604 respectively. The first voice or unified messaging system 602 is associated with the first mailbox 118, and the second voice or unified messaging system 604 is associated with the second mailbox 120. Each of the voice or unified messaging systems 602 and 604 include the entire messaging functionality for the system. Thus the voice or unified messaging system 602 provides all messaging functionality for subscribers having extensions connected to the first PBX 104. Similarly the voice or unified messaging system 604 provides all messaging functionality for subscribers having extensions connected to the second PBX 108.

As discussed hereinabove in relation to the embodiments of FIGS. 1 and 3, the purpose of the present invention is that any subscriber mailbox can be accessed through any voice or unified messaging system. In the example of FIG. 6, this is achieved by the first and second voice or unified messaging systems 602 and 604 intercommunicating via the data network 146.

To illustrate this further, the example described hereinabove where a calling party associated with an extension connected to the first PBX 104 calls an extension connected to the second PBX 108 is considered again.

The second PBX 108 detects that the called extension to which the second phone 110 is connected has voice mail services activated. The second PBX 108 determines the origin of the call, and sends control signals to the first PBX 104 via the PBX network 144. The control signals request the first PBX 104 to provide voice mail services for the call by directing the call to the voice or unified messaging system 602 associated with the PBX 104.

The voice or unified messaging system 602 detects that the call directed to it is for a subscriber associated with the second voice or unified messaging system, and requiring access to the mailbox Mbx2 120 of the second voice or unified messaging system 604. As such, the voice of unified messaging system 602 interacts with the second voice or unified messaging system 604 via the data network 146, to access the mailbox 120.

Recorded announcements are played to the calling party through the voice or unified messaging system 602, and any voice mail message is left in the mailbox 120 via the voice or unified messaging system 602. Thus, the voice or unified messaging system 602 effectively acts as a "gateway" to the voice or unified messaging system 604.

Thus the invention can be implemented in a conventional voice or unified messaging architecture, where stand-alone systems are deployed with associations to particular telephony switches. The invention can be implemented by providing appropriate communication between the voice or unified messaging systems. Although this requires establishment of a data connection such as over the data network 146, this is not as costly as maintaining a connection over the PBX network 144.

Although in FIG. 6 the stand-alone voice or unified messaging systems are shown as interconnected via a data network, they may be interconnected in other ways. This may depend upon the number of messaging systems deployed in the messaging architecture.

The present invention is described herein with reference to particular examples. The invention is not limited in its applicability to the examples given. One skilled in the art will appreciate the general applicability of the present invention.

The invention claimed is:

1. A messaging architecture comprising:
   first and second messaging systems coupled to respective first and second telephony switches;
   the first and second telephony switches being coupled to respective first and second pluralities of subscriber terminals;
   the first and second messaging systems having respective first and second pluralities of subscriber mailboxes associated therewith;
   wherein the first messaging system is configured to access not only the first plurality of subscriber mailboxes associated with said first messaging system but also the second plurality of subscriber mailboxes associated with the second messaging system;
   wherein a call received in the second telephony switch from the switch, the call originating from one of the first plurality of subscriber terminals coupled to the first telephony switch and having as its destination one of the second plurality of subscriber terminals coupled to the second telephony switch, is directed from the second telephony switch to the first messaging system via the first telephony switch if messaging services are needed for the call, so as to allow the first messaging system to provide the messaging services for the call using one of the second plurality of subscriber mailboxes associated with the second messaging system; and wherein the first and second messaging systems collectively comprise respective front-end systems and a common centralized message store system shared by the front-end systems, the front-end systems being remotely located from one another and from the centralized message store system, the centralized message store system being adapted for communication with said front-end systems over a network.

2. A messaging architecture according to claim 1 in which there is provided a data connection between the messaging systems.

3. A messaging architecture according to claim 1 wherein each messaging system comprises its front-end system and a corresponding back-end system, the back-end system for each messaging system providing functionality for supporting the subscriber mailboxes of that messaging system.

4. A messaging architecture according to claim 3 wherein the back-end system for each messaging system is provided in the centralized message store system.

5. A messaging architecture according to claim 4 wherein the front-end system is adapted to access each subscriber mailbox via the back-end system.

6. A messaging architecture according to claim 1 wherein each telephony switch is adapted to selectively route a given call in dependence upon a least-cost route for establishing a connection to a voice server front-end system.

7. A messaging architecture according to claim 1 wherein each telephony switch is adapted to selectively route a given call to a messaging system associated with an origin of the given call.

8. A messaging architecture according to claim 7 wherein the given call is routed via the telephony switch associated with the messaging system associated with the origin of the call.

9. A messaging architecture according to claim 1 in which the first and second messaging systems are associated with respective voice mail domains, wherein the first and second messaging systems are further adapted to handle a given call in accordance with one or more requirements of the voice mail domain with which a given called subscriber mailbox is associated.

10. A method of storing a voice mail message in a messaging architecture, the messaging architecture comprising first and second messaging systems coupled to respective first and second telephony switches, the first and second telephony switches being coupled to respective first and second pluralities of subscriber terminals, the first and second messaging systems having respective first and second pluralities of subscriber mailboxes associated therewith, the method comprising the steps of:

configuring the first messaging system to access not only the first plurality of subscriber mailboxes associated with said first messaging system but also the second plurality of subscriber mailboxes associated with the second messaging system; and for a call received in the second telephony switch from the first telephony switch, the call originating from one of the first plurality of subscriber terminals coupled to the first telephony switch and having as its destination one of the second plurality of subscriber terminals coupled to the second telephony switch, directing the call from the second telephony switch to the first messaging system via the first telephony switch if messaging services are needed for the call, so as to allow the first messaging system to provide the messaging services for the call using one of the second plurality of subscriber mailboxes associated with the second messaging system;

wherein the first and second messaging systems collectively comprise respective front-end systems and a common centralized message store system shared by the front-end systems, the front-end systems being remotely located from one another and from the centralized message store system, the centralized message store system being adapted for communication with said front-end systems over a network.

11. A method according to claim 10 further comprising providing a data connection between the messaging systems for routing the call.

12. A method according to claim 10 further comprising dividing each messaging system into its front-end system and a corresponding back-end system, wherein the back-end system provides functionality for supporting the at least one subscriber mailbox of that messaging system.

13. A method according to claim 12 wherein said back-end systems of said messaging systems are implemented in said centralized message store system.

14. A method according to claim 13 further comprising adapting each front-end system to access each subscriber mailbox via the back-end system.

15. A method according to claim 10 further comprising controlling each telephony switch to selectively route a given call in dependence upon a least-cost route for establishing a connection to the mailbox.

16. A method according to claim 10 further comprising controlling each telephony switch to selectively route a given call to a messaging system closest in geographical location to the telephony switch to which a calling party is connected.

17. A method according to claim 10 wherein the first and second messaging systems are associated with respective voice mail domains, and a given one of the messaging systems is adapted to handle a given call in accordance with one or more requirements of the voice mail domain with which a given subscriber mailbox is associated.

18. An apparatus comprising:

a first messaging system, the first messaging system being coupled to a first telephony switch, the first messaging system having a first plurality of subscriber mailboxes associated therewith, the first messaging system being configured to access not only the first plurality of subscriber mailboxes associated with said first messaging system but also a second plurality of subscriber mailboxes associated with a second messaging system coupled to a second telephony switch;

wherein a call received in the second telephony switch from the first telephony switch, the call originating from one of a first plurality of subscriber terminals coupled to the first telephony switch and having as its destination one of a second plurality of subscriber terminals coupled to the second telephony switch, is directed from the second telephony switch to the first messaging system via the first telephony switch if messaging services are needed for the call, so as to allow the first messaging system to provide the messaging services for the call using one of the second plurality of subscriber mailboxes associated with the second messaging system; and wherein the first and second messaging systems collectively comprise respective front-end systems and a common centralized message store system shared by the front-end systems, the front-end systems being remotely located from one another and from the centralized message store system, the centralized message store system being adapted for communication with said front-end systems over a network.

19. An apparatus comprising:

a first telephony switch coupled to a first messaging system, the first messaging system having a first plurality of subscriber mailboxes associated therewith, the first messaging system being configured to access not only the first plurality of subscriber mailboxes associated with said first messaging system but also a second plurality of subscriber mailboxes associated with a second messaging system coupled to a second telephony switch;

wherein a call received in the second telephony switch from the first telephony switch, the call originating from one of a first plurality of subscriber terminals coupled to the first telephony switch and having as its destination one of a second plurality of subscriber terminals coupled to the second telephony switch, is directed from the second telephony switch to the first messaging system via the first telephony switch if messaging services are needed for the call, so as to allow the first messaging system to provide the messaging services for the call using one of the second plurality of subscriber mailboxes associated with the second messaging system; and wherein the first and second messaging systems collectively comprise respective front-end systems and a common centralized message store system shared by the front-end systems, the front-end systems being remotely located from one another and from the centralized message store system, the centralized message store system being adapted for communication with said front-end systems over a network.

* * * * *

UNITED STATES PATENT AND TRADEMARK OFFICE
CERTIFICATE OF CORRECTION

| | | |
|---|---|---|
| PATENT NO. | : 7,231,022 B2 | Page 1 of 1 |
| APPLICATION NO. | : 10/888375 | |
| DATED | : June 12, 2007 | |
| INVENTOR(S) | : C.N. Didcock et al. | |

It is certified that error appears in the above-identified patent and that said Letters Patent is hereby corrected as shown below:

On Title Page
In Item (75) Inventors:

Clifford Neil Didcock, please delete "Wantage (GB)" and insert --Sammamish, WA--

Col. 10, line 59, insert --first telephony-- before "switch".

Signed and Sealed this

Fourth Day of September, 2007

JON W. DUDAS
*Director of the United States Patent and Trademark Office*